April 21, 1970 M. G. BATTY 3,507,159
SPEED CHANGING MECHANISMS
Filed Oct. 20, 1967 6 Sheets-Sheet 2

April 21, 1970 — M. G. BATTY — 3,507,159
SPEED CHANGING MECHANISMS
Filed Oct. 20, 1967 — 6 Sheets-Sheet 4

April 21, 1970     M. G. BATTY     3,507,159

SPEED CHANGING MECHANISMS

Filed Oct. 20, 1967     6 Sheets-Sheet 5

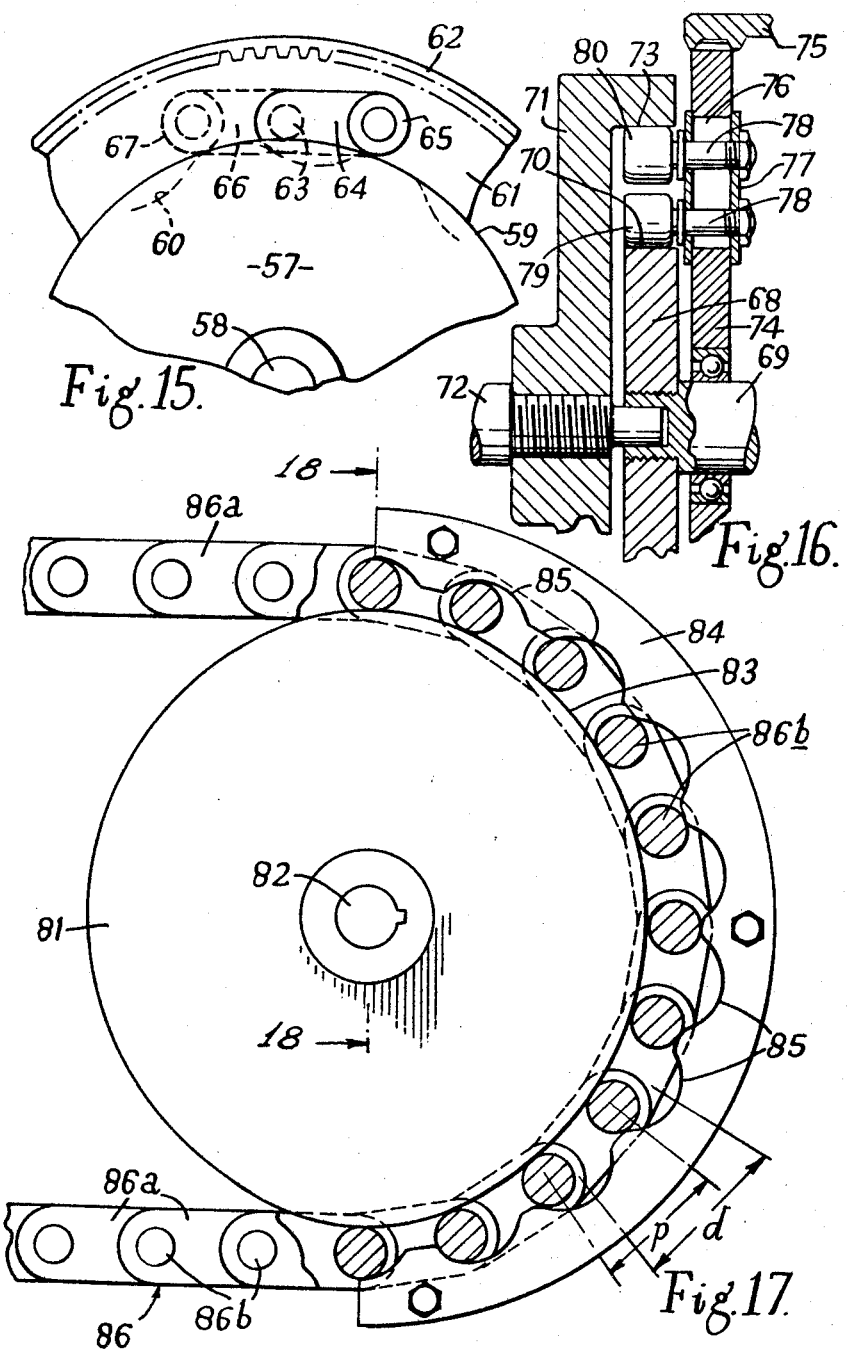

United States Patent Office 3,507,159
Patented Apr. 21, 1970

3,507,159
SPEED CHANGING MECHANISMS
Michael G. Batty, Uckfield, England, assignor to
Patrick George Leeson, Rothley, England
Filed Oct. 20, 1967, Ser. No. 676,881
Claims priority, application Great Britain, Oct. 22, 1966,
47,484/66
Int. Cl. F16h *17/00*
U.S. Cl. 74—63
20 Claims

ABSTRACT OF THE DISCLOSURE

A speed changing mechanism having a rotary or linear motion and comprising a component provided with a recessed face consisting of a number of sections, each including a recess, which are all of one shape and are joined together end-to-end, a component provided with a cam, and either one array or two interconnected arrays of rollers of spherical or cylindrical form which, in operation, is or are respectively in constant contact with the recessed face and the cam, the number of rollers in the or each array being different to the number of recesses, whereby in operation relative movement between any two of the three parts of the mechanism causes the rollers in contact with the recessed face to move seriatim into and out of driving engagement with the recesses under the control of the cam, so that the third part of the mechanism is driven. The shape of each section of the recessed face is decided upon by reference to various practical mechanical design considerations and consists of at least two differently shaped portions, and then the shape of the cam is determined by a process of generation from the recessed face.

---

This invention is concerned with speed changing mechanisms. The expression "a speed changing mechanism" as used herein means a mechanism with either a rotary or a linear motion by means of which power supplied to an input member is transferred to an output member moving at a speed different from the speed of the input member. The relation between the two speeds is referred to as the input/output ratio.

Various types of speed changing mechanisms are known. Probably the best known type comprises essentially a number of meshing toothed gears, e.g. as in the gearbox of an automobile.

Another lesser known type of speed changing mechanism comprises a combination of a cam with two arrays of elements which co-operate together rather after the fashion of gear teeth, the elements of one array being all of one shape and fixed relative to, and evenly spaced from one another, while those of the other array, which are also all of one shape, move relative to one another, seriatim, into and out of a condition of driving engagement with those of the first mentioned array, under the control of the cam. This type of mechanism will hereinafter be referred to as "a speed changing mechanism of the type concerned."

U.S. specification No. 1,543,791, for example, shows a speed changing mechanism of the type concerned with a rotary motion. In FIGURE 2 of the drawings of that specification is shown a rotary cam in the form of an eccentric *c* in combination with a first array of evenly spaced fixed elements (all of one shape) provided by the teeth on the ring *g*, and a second array of relatively movable elements (all of one shape) in the form of specially shaped plungers (*e*) which are moved seriatim into and out of a condition of driving engagement with the teeth on the ring *g* by the eccentric *c* as the mechanism operates. An input shaft *a* is secured to the eccentric *c* while the plungers *e* are guided for sliding movement in an extension *b'* of an output shaft *b*; the ring *g* is fixed.

Speed changing mechanisms of the type concerned and closely similar to that shown in this U.S. specification (and so having an array of relatively movable specially-shaped plungers) have, it is believed, reached commercial acceptance only in embodiments where the input/output ratio is relatively high (say 20:1) and the input speed is comparatively low. As will be realised, a mechanism such as that shown in this U.S. specification is of a complex construction and does not readily lend itself to economic production in a wide range of sizes, input/output ratios, input speeds and power handling capacities; in short, it is not readily adaptable to a wide range of applications and being, in addition, costly to manufacture has not been found in very large numbers in industry.

I am unaware of any non-rotary speed changing mechanisms of the type concerned in use in industry.

Speed changing mechanisms of the type concerned have also been proposed in which each element of the second mentioned array comprises a roller (whether of a cylindrical or spherical character), the rollers being guided, for movement in their engagement with the array of elements constituting the first mentioned array, by a roller-guiding component, and the rollers may themselves engage the cam, or each roller may be operated by an associated roller which later then engages the cam, the two associated rollers being connected to move to-and-fro together; such a mechanism may thus comprise two arrays of rollers or a single array.

A speed changing mechanism of the type concerned which is constructed in the way set out in the preceding paragraph is hereinafter called "a roller-based mechanism of the type referred to." A roller-based mechanism of the type referred to could have either a rotary or a linear motion. As far as I am aware, no roller-based mechanism of the type referred to has ever been available commercially.

It is one of the various objects of the present invention to provide a commercially acceptable roller-base mechanism of the type referred to; it is another of the various objects of the present invention to provide for designing and manufacturing a commercially acceptable roller-based mechanism of the type referred to so that such mechanisms shall become readily available for a wide range of applications, having in mind the desirability of simplicity of manufacture and standardisation of parts.

As will be appreciated, a roller-based mechanism of the type referred to has (in addition to the rollers) three principal components, viz. (i) the cam, (ii) the roller-guiding component and (iii) the array of elements fixed relative to one another. For convenience and brevity these three components of a roller-based mechanism of the type referred to will hereinafter be referred to respectively as the cam (i), the component (ii) and the array (iii).

It will be appreciated that it is not necessary, in a roller-based mechanism of the type referred to, for the cam (i) to be the input and the component (ii) to be the output and the array (iii) to be fixed, c.f. U.S. specification No. 1,543,791; for example the component (ii) could be fixed and the array (iii) the output; indeed, none of (i), (ii) or (iii) need be fixed if it is desired that the output be controlled from two inputs.

For convenience of description it should be pointed out that in a roller-based mechanism of the type referred to each of the elements in the array (iii) is spaced from its neighbors by two opposite recesses, such recesses being all of one shape. The arrangement is such that the elements and recesses provide on the array (iii) a continuous cam track for the rollers and that this track consists of a number of sections (all of one shape) joined together end to end, the number of such sections being the same as the number of elements in the array (iii).

Such information as is available about certain prior-proposed roller-based mechanisms of the type referred to leads me to believe that it was contemplated by those interested in them that the shape of the cam (i) should be decided first—for example that the cam (i) should be an eccentric. It seems to me, however, that once the shape of the cam (i) has been decided upon, and the size of the rollers has been chosen, a resultant shape for the cam track on the array (iii) must necessarily follow if the rollers are to be controlled at all times and hence not to be allowed to chatter undesirably. Whether such resultant shape will then be a shape which practical mechanical design considerations, such as input speed, maximum torque values, ease of manufacture and standardisation etc. would permit in a commercial mechanism, or even tolerate, has not, apparently, been considered heretofore. Thus, for example, where the cam (i) is an eccentric the elements of the array (iii) will, in most instances, be formed with pointed cusps liable to wear away quickly and give rise to chatter.

The present invention provides, in one aspect, a roller-based mechanism of the type referred to wherein the array of rollers remains in constant contact both with the cam (i) and with the track on the array (iii) (or, where there are two arrays of rollers, one array remains in constant contact with the cam (i) and the other with the cam track on the array (iii) as the mechanism operates, and wherein each section of the cam track on the array (iii) has first been decided as to shape by reference to practical mechanical design considerations such as input speed and power, maximum torque values and hence loads on the respective components, size and cost of commercially available rollers, ease of manufacture and a standardisation of component parts etc. and consists of:

(a) At least two curved portions conforming to one known formula but with a different constant (or constants) for each portion; or (b) At least two curved portions conforming to two different formulas; or (c) At least one curved portion conforming to a known formula and at least one linear portion; or (d) In the case where the mechanism has a linear motion only, at least three linear portions at different inclinations:

The shape of the cam (i) having then been determined by a process of generation from the shape of the cam track on the array (iii) having regard to the required input/output ratio, the size of the rollers and the number of recesses in the array (iii) as against the number of rollers.

I prefer in a mechanism as referred to in the last preceding paragraph alternative (a) and with a rotary motion, that the known formula should be the formula for a circular arc and that each recess should comprise a central portion in the form of a circular arc (of a chosen radius) which blends at each end into a circular arc of a chosen smaller radius, the centres of the circular arc of smaller radius lying on the opposite side of the track on the array (iii) to the centre of the arc of larger chosen radius. It will be appreciated that in commercial manufacture the cutting of arcs of circular shape is easier than cutting portions of the cam track to curves conforming with other known formula.

It has also been found that where the difference between the chosen radii just referred to is twice (or substantially twice) the radius of the rollers engaging the track on the array (iii) acceleration forces on the rollers are greatly reduced resulting in a more troublefree and long lasting mechanism.

In a roller-based mechanism as specified in the last preceding paragraph but two, with a rotary motion, wherein the distance of the cam track on the array (iii) from the axis varies along the track, it is possible to provide each section of the track with a portion whose distance from the axis remains constant, i.e. a curved portion in the form of an arc of a circle centred about the axis, such portions separating the recesses one from another and constituting portions which are hereinafter referred to as "lands"; the provision of such lands will call for the provision on the cam (i) of a corresponding arc of a circle centred about the axis. It is then contemplated, having obtained a mechanism in which the recesses in the cam track on the array (iii) are of a shape which is satisfactory commercially both from the manufacturing and operating point of view, obtaining an input/output ratio of (say) 13:1 from 14 recesses and 13 rollers or, alternatively 12:1 from 13 recesses and 12 rollers, the recesses on the alternative arrays (iii) being of precisely the same shape but with longer lands between the recesses where there are 13 than where there are 14, whilst using the same size of blank for the array (iii). By this means, so it has been found, I can readily provide a set of mechanisms having input/output ratios of (say) 13, 12, 11 and 10 to 1 which are of the same size, have the same rollers (i.e. have rollers of precisely the same specification), have the same shape of recesses which can be cut from one form cutter and whose principal components can be fashioned from the same sized blanks; the shapes of the cams (i) will differ, of course, in minor degree from one member of the set to another.

The present invention thus further provides a method of manufacturing a roller-based mechanism of the type referred to and with a rotary motion, which comprises the steps of first deciding upon the shape of the recesses along the cam track on the array (iii) by reference to practical design considerations such as input speed and power, maximum torque values, ease of manufacture, size of commercially-available rollers etc., designing the cam track on the array (iii) to provide the number of recesses called for by the desired input/output ratio with lands therebetween, generating from the resultant cam track on the array (iii) the shape of the cam (i) required for the rollers to remain in constant contact both with the cam (i) and with the cam track on the array (iii) (or, where there are two arrays of rollers, for one array to remain in constant contact with the cam (i) and the other with the cam track on the array (iii)) as the mechanism operates, and making up the mechanism to the design obtained.

The present invention also provides a set of roller-based mechanisms of the type referred to, and with a rotary motion, each member of the set having a different input/output ratio, wherein the recesses in the cam tracks on the array (iii) for all members of the set are all of one shape, such shape having been decided by reference to practical mechanical design considerations such as those indicated hereinbefore, but the recesses in each member of the set are separated one from another along the track by lands of a size which differs from one member of the set to the next so as to provide for a different number of recesses in each member of the set while the rollers are the same for all the set and the shapes of the cams (i) (which differ from one member of the set to the next) have been generated from the various cam tracks on the arrays (iii) so as to ensure that the rollers remain in constant contact both with the cam (i) and with the cam track on the array (iii) (or, where there are two arrays of rollers, the one array remains in constant contact with the cam (i) and the other with the cam track on the array (iii)) as the mechanisms operate.

To illustrate the invention by way of example, I have selected for description the design and manufacture of a roller-based mechanism of the type referred to parts of which are shown in the accompanying drawings. This mechanism itself also illustrates the invention by way of example.

In the drawings:

FIGURES 14, 15 and 16 show further examples of mechanisms according to the invention.

FIGURE 17 shows another example of a mechanism according to the invention.

Figure 1:
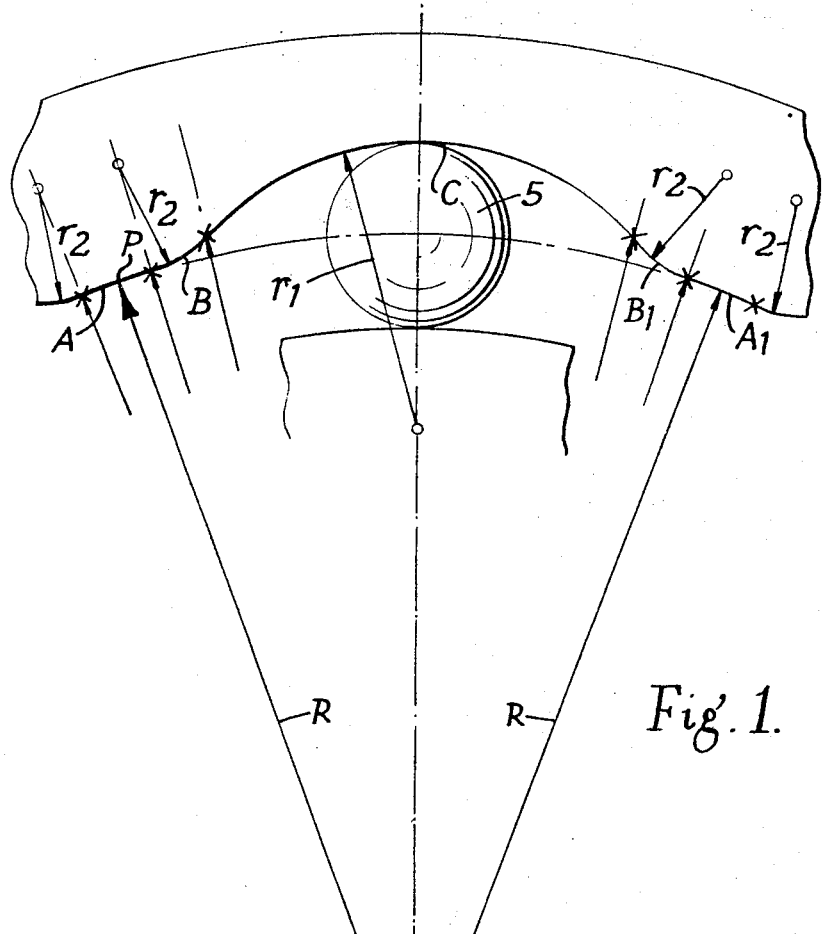
FIGURE 1 shows details of the cam track on the array (iii) of the mechanism.

The mechanism comprises a cam 1 which is secured to an input shaft 7 and constitutes the cam (i), a roller-guiding component (constituting the component (ii)), in the form of a cylindrical extension 10 of an output shaft 12, which latter runs in a bearing set in a fixed casing 11, and a fixed component (iii) in the form of an annular array of evenly-spaced teeth 9 (separated by recesses 5) set in a fixed ring 13. Rollers 2 are controlled for radial sliding movement in the extension 10 by engagement with closely fitting guide walls 4.

Figure 2:
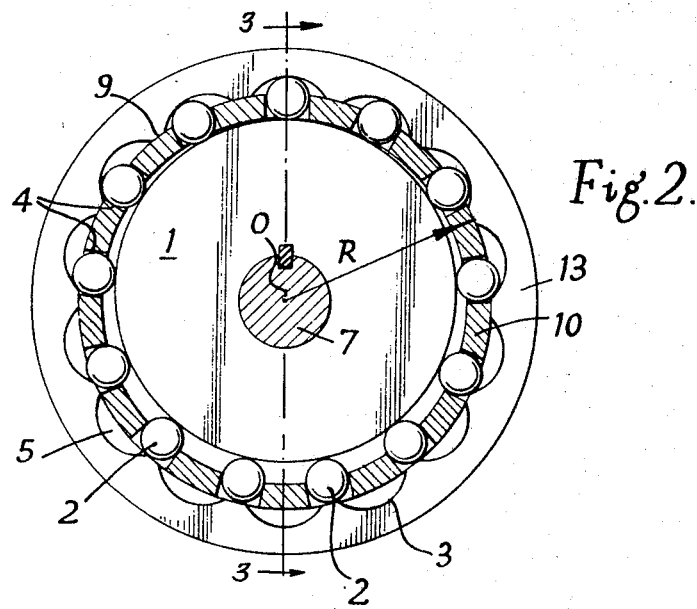
FIGURE 2 is an elevational view on a smaller scale than FIGURE 1 of part of the mechanism.
Figure 3:
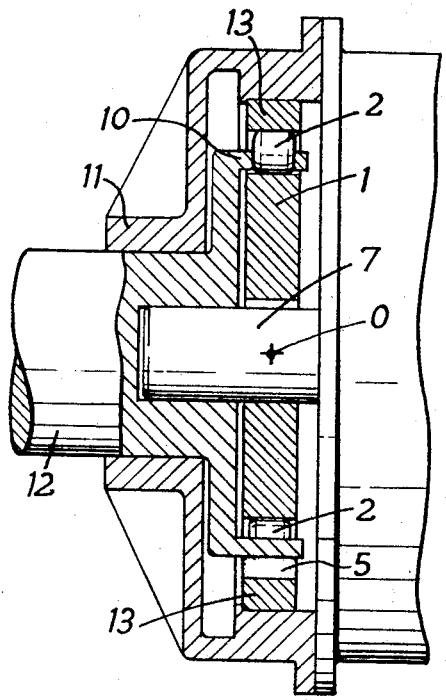
FIGURE 3 is a central vertical sectional view of the mechanism taken on line 3—3 of FIGURE 2.

In designing and manufacturing the mechanism of FIGURES 1, 2 and 3 I begin by deciding upon the shape of the recesses 5 and of the intermediate teeth 9. The recesses 5 and the intermediate teeth 9 may be thought of as providing a continuous cam-track (referred as the track 3 on the array (iii)), and it is the shape to be given to the track 3, having regard to the diameter of the rollers 2 that it is desired to use, which is considered first.

One might think it would be satisfactory to adopt any arbitrary shape for the cam track 3 and that, by following this track on a specially devised generating machine, the corresponding track on the cam (i) could be cut. Whilst possible, however, such a procedure I have found to be both undesirable and impractical. In practice I decide that, in the cam track 3, the curved portions shall conform to known formulae which, for example, can be fed into computer controlled cutting machines to enable precise contours to be cut to close limits to make a master cam track 3. Alternatively, displacements can be calculated, to the required scale and accuracy, at regular increments using the appropriate formulae, and this data can be used to cut the cam track 3 direct, or a scaled up version for a master form, by a number of well established methods. Thus it is the use of curves of known formulae in the contour of the recesses 5 (any straight lines, of course, presenting no difficulty) which provides the vital link in practice between the chosen shape of the cam track 3 and its manufacture and the same considerations apply often more cogently to the manufacture of the cam track of the cam 1 the profile of which is generated from the profile of the cam track 3.

Whilst cycloidal, elliptical, polynominal or other curves could be used to shape parts of the shape of the cam track 3, provided (for practical purposes) that they followed known formulae, the most practical curve to apply in most instances having recourse to machinery already available, is a combination of true circles and/or straight lines, which blend into one another in most instances.

In FIGURE 1 an enlarged view of part of the track 3 is shown. The track 3 consists of fourteen sections (all of one shape) joined together end to end, one such section extending between the points P and Q. In the section shown, a convex central portion in the form of a circular arc C, radius $r_1$ blends at each end into a circular arc B and $B_1$ of a smaller radius $r_2$, which latter blend into convex circular arcs A and $A_1$ both of radius R. The centres of the arcs B and $B_1$ lies outside the track 3 and the centre of the arc C lines inside, as will be seen. It will be noted that only half of the arcs A and $A_1$ lie within the section PQ and that their centres are at the point O which is also the axis of the cam 1 and extension 10. The complete arcs A and $A_1$ are the portions referred to as "lands."

I contemplate, as one of various alternatives to that shown in FIGURE 1, that the track 3 could be formed by using a circular curve for the arc A and a convex curve of known formula, but preferably circular, for the arc C, with straight portions either between them or within the arc C. Also the land A could be omitted. The fact that it is possible, by using my invention, to provide for lands A is important as already mentioned and referred to again later.

For satisfactory operation on a commercial basis it is essential that each roller 2 be in constant contact both with the track 3 and with the opposing track on cam 1, subject only to allowances for manufacturing tolerances and lubrication film allowance, and in theory the cam 1 is generated on the hypothesis of constant contact.

The procedure for deciding the shape of the recess 5 and consequently the shape of all the recesses 5 in the component (iii) is of crucial importance for meeting the required design parameters and can be explained in detail as follows:

The dimensions of the recesses 5 are determined in harmony with the diameter of the rollers 2 so that both factors must be considered together in considering the principal determinants which are: the input/output ratio, the input power and speed, the torque to be transmitted, the loads born by component parts, the space available, the allowable cost, the allowable backlash, permissible overhung loads, manufacturing materials and methods to be employed etc. In addition an important cost consideration arises from the commercially availability of low cost rollers to accurate specifications. One of the principal objects of the invention is to enable roller-based mechanisms of the type referred to to compete in as wide a field as possible, and such commercial considerations are of great importance in the original design concept.

Once the diameter of the rollers 2 is settled, certain limiting dimensions are imposed upon the profile of the recesses 5. For example, the radius $r_1$ in FIGURE 1 cannot be less than the radius of the rollers $r$ and in most instances may well be 3 to 4 times greater. Also the length of the guide walls 4 cannot exceed the radius $r$ unless the rollers are individually linked with a second set as shown in subsequent arrangements. If the rollers 2 and the circular arcs C, B and A in FIGURE 1 have radii represented by the symbols $r$, $r_1$, $r_2$ and R respectively, certain guiding principles used in the early design stages for higher speed applications can be formulated, such as that $r_1-r_2=2r$, which relationship, if adhered to, ensures that the rollers follow a path of symmetrical form consisting of two arcs of the same radius, one being the reverse of the other so that acceleration forces on the rollers are greatly reduced within a given recess span resulting in a more troublefree and long lasting mechanism. To reduce the absolute values of these acceleration forces it is necessary to increase the recess span which in turn may necessitate an increase in R. An increase in·R is an advantage in leverage at the cost of a decrease in the effective cam angles and higher relative cam speeds for a given recess shape but if the span of the recess is increased, more rollers are brought in to share the driving load. It will be appreciated that, by the use of the invention, the necessary flexibility to meet such varying requirements is made available but that the calculation to arrived at the optimal dimensional relationships in the more sophisticated applications can be involved. Some rough rules in the early design stages for such applications, such as that R is likely to be in the region of 10 times the sizes of $r$, and $r_1$ three times $r$, are helpful in this respect when considered in conjunction with the relationship for $r_1$, $r_2$ and $r$ referred to above. The design limitation that the guide walls 4 cannot exceed $r$ in length in the type of arrangement shown in FIGURE 1, has been mentioned.

Pursuant to the aforementioned considerations, the input/output ratio required in a particular application has to be considered in relation to the space available. If, for example, an arrangement of the type known in FIGURES 1, 2 and 3 has been chosen as the most suitable and the circumference of the circle with radius R must not exceed 10" in length to meet the requirement for the unit or range of units, it is clear that there is space for ten recesses spanning 1" circumferentially provided that no lands are interposed between them. With the array (iii) held and component (ii) the output, the latter will rotate at one ninth of the input speed in a reverse direction or one eleventh in the same direction if nine or eleven rollers 2 are incorporated respectively. Alternatively, if the array (iii) were arranged as the output and (ii) is held, (iii) will rotate at one tenth of the input speed, and in the same direction, if there are nine rollers 2 and in the reverse direction if there are eleven. Whilst smaller input/output ratios can be arranged within the space dictated by reducing the number of recesses 5 and co-operating rollers 2, or by increasing the numbers of lobes on cam 1 in a manner referred to later, it is clear that higher input/output ratios can only be obtained in this instance by other means since at the input/output ratio of 10, all the available space for recesses has been used and there is no space left for any lands to be interposed. The other measures may include a reduction in the span of the recesses with or without recourse to a reduction in the size of the rollers 2, compounding, reversing the relative positions of the cam tracks relative to the axis, making the tracks run at right angles to the axis, using longer rollers or twin rollers to reduce the loading and so on. If, however, it is possible, in this example, to reduce the span of the recesses to ¾", without detriment to the drive characteristics that result, ten recesses will only take 7.5" leaving 2.5" to be equally distributed among ten lands. Furthermore the input/output raito can be increased up to 13/1 and there will still be some circumferential space to be taken up by lands, keeping the recesses all of one shape. This example illustrates the importance of being able to employ lands between recesses which latter therefore do not need to be contiguous i.e. the arc B need not blend into or contact its neighboring curve in the next recess (see FIGURE 1). Thus a standard shape and size of recess can be chosen in relation to a given diameter of roller for a whole range of applications and input/output ratios, a factor of much importance affecting economy of design and manufacture. To take the example actually illustrated in FIGURE 2, there are fourteen recesses 5 and thirteen rollers 2, the array (iii) being fixed to the casing 11. The component (ii) will therefore rotate in the reverse direction to the input shaft 7 at a speed reduced in the ratio of 13 to 1. I contemplate that, by using the same size of basic blank for the part 13, recesses of precisely the same shape, but with only 13, 12, 11 etc. provided in different blanks combined with longer lands, we can furnish a set of mechanisms having input/output ratios of (say) 13, 12, 11 and 10 to 1 which are of the same size, are made from the same basic blanks, and have recesses which are the one shape which is satisfactory commercially both from the manufacturing and operating points of view. It will be appreciated that where lands are provided in track 3 there will be on the cam 1 a corresponding arc of a circle centered about the axis of the shaft 7. After determining an advantageous shape for the track 3 and the diameter of the rollers 2 the shape of the cam 1 is determined by a process of generation described in detail later.

Figures 4, 5:
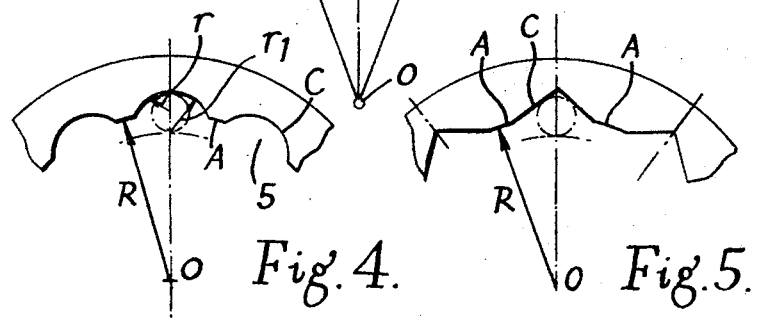
FIGURE 4 is a view similar to that of FIGURE 1 showing a further example of a recess.
FIGURE 5 is a similar view showing yet a further example of a recess.

In FIGURE 4 of the drawings a simpler shape of recess 5 is illustrated which consists of a convex circular portion C which is preceded and followed by lands A of circular shape with their centre at O, the axis of the unit. The radius $r_1$ of the portion C is approximately twice $r$ the radius of the rollers 2 and clearly this type of recess is easier to manufacture than the type shown in FIGURE 1. In effect the radius $r_2$ has been reduced to zero in this instance, which is as referred to again later.

It will be appreciated that in this instance the value of including a land lies not only in being able to vary its size to include more or less recesses but also to give strength to the teeth 9 which would otherwise come to a sharp point when $r_1$ is zero. This argument also applies in the case shown in FIGURE 5 of the drawings when the arc C has been replaced by two straight lines enclosing the recess 5. When the recess is shaped in this manner the rollers are forced into instantaneous reversal at their furthest point from O the axis of the unit and therefore a unit incorporating such a shaped recess, whilst easy to manufacture, can only be used for very slow speed applications and is likely to be more useful in linear form as referred to later, since in linear or high torque slow speed rotary applications, design considerations are primarily dictated by the pressures on the cam tracks and rollers and the number of rollers in driving position to share the load whilst acceleration forces are of little significance.

In linear applications (which by their nature usually involve relatively slow speeds) and occasionally in slow speed rotary applications it may be desirable to use a track 3 having linear portions between or within the curved portions in each section. A section of such a track 3 (to be considered as incorporated in a mechanism like that of FIGURES 1 to 3) is shown in FIGURE 4 of the drawings and has a land portion A which is concave, circular and concentric blending into a convex circular portion B and successively into a linear portion D, a concave circular portion C and a linear portion D' being the image of D and so on.

It is possible at higher speeds that part or all of the curved portions of the recess might better conform to some shape with a known formula other than circular. Clearly this complicates the manufacturing process and incidentally the process of calculating the shape of the cam 1, as referred to in the next paragraph, and is therefore to be avoided in practice if at all possible.

Once the best solution for the shape of the recess 5 in relation to the requirements of the application has been decided, the design of the array (ii) and component (iii) follows readily. The procedure for calculating the shape of the cam 1, by the aforementioned process of generation, consists of calculating the precise displacements required on the cam 1 to maintain constant contact of the rollers 2 with the cam 1 and the track 3 at successive angular positions of the cam 1, which displacements must correspond with the displacements of the rollers 2 in contact with the predetermined track 3. Such a procedure must, of course, include consideration of the relative velocities of the components (i), (ii) and (iii) which are a function of the input/output ratio.

It is clear that it would be exceptional for the shape of the cam 1 generated from a cam track 3 designed precisely to suit any particular application, to be an eccentric. For the track of the cam 1 to be a true eccentric it would be impossible to include lands in the track 3 (which latter, as indicated, automatically require corresponding concentric portions on the cam 1) and therefore it would be impossible to alter the input/output ratio by altering the number of standard recesses. Furthermore, it would be impossible to obtain the required drive characteristics by manipulating the shape of the cam track 3 to suit particular case, because the dimensions are rigidly controlled by the characteristics of the eccentric and cannot be altered except by varying the throw and centres of the eccentric. A further factor that is difficult to reconcile with a particular application is the strength of the teeth 9 when using an eccenric. However, the eccentric arrangement requires no generation procedure as described, being a special case whereby observance of certain simple conditions ensues that continuous contact between the rollers and the cam tracks takes place at all times as will be apparent from the explanation in the next paragraph.

Figure 7:
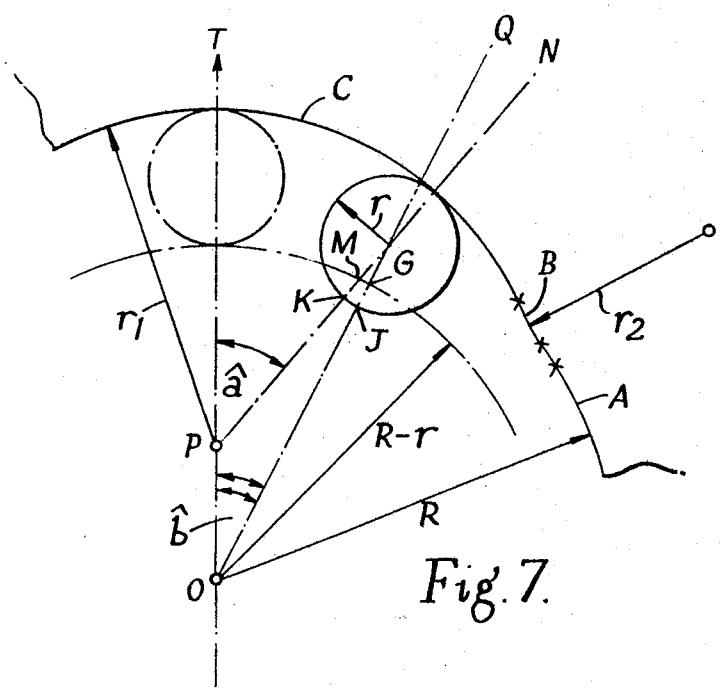
FIGURE 7 shows a method of generating the shape of the cam.

The procedure for generating the shape of the cam 1 may be better understood by referring to FIGURE 7 of the drawings.

The roller with radius $r$ is presumed to have moved around the arc C to a point where its centre lies on the line OQ from the central position when it lay on OT i.e. through an angle of $b$ measured at the centre of the unit or an angle $a$ measured at the centre of the arc C. If J is the point where the line OQ cuts the periphery of the roller and G the point where it cuts the circle with radius $R-r$ it is clear that JG is the displacement required to correspond with the angle $b$ and that the cam 1 will measure $R-r-JG$ along the radius at angle $b$, if only one lobe and one concentric portion on the cam 1 is to be generated which subtends the same angle at the centre O as one recess and one land (or one recess if there is no land). It can be seen that the line PN, a line from the centre P of the circular arc C passing through the centre of the roller, cuts the periphery of the roller at K, and the circle with centre O and radius $R-r$ at M. It must be emphasized that KM is *not* the displacement required (but if it were then the cam 1 would be a circle of radius PK concentric to the circle with radius $r_1$ and could be defined as an equidistant from the arc C of the recess).

I can rarely, if ever, contemplate the special case when the point P centre of the arc C lies on the centre of the unit O and gives rise, therefore, to an equidistant as the shape of the cam 1. The case of the eccentric has been mentioned, but other special cases arise when curves other than circular are used for the portion C and equidistants are used for the shape of the cam 1.

Having calculated the displacements for successive positions of the roller, at increments suitable to the method of manufacture to be adopted, it is now necessary to consider the reduction ratios to be achieved for a given number of recesses and hence the number of lobes required on the cam 1. If as many lobes as recesses were reproduced, the array (iii) would rotate at the same speed as the cam (i) if component (ii) is held, and in the same or reverse direction according to whether there were one less or one more in the number of rollers compared with recesses. This arrangement can therefore be useful in differential mechanisms.

If, on the other hand, the cam 1 is re-phased by increasing the subtended angles between the calculated displacements to the point that the cam lobe and any concentric portion take up the full 360° of the cam 1 the array (iii) will rotate at a speed reduced in relation to the input speed by the number of recesses with the same rule for direction as stated above. If the cam 1 is re-phased by phasing the displacements over 180° and then the pattern is repeated over the next 180°, in other words a cam shape with two lobes and two concentric portions is created, the reduction achieved with one lobe is halved, provided the necessary condition is observed that the input/output ratio is still an integer and that the difference between the recesses and rollers is now two in number. The same process can be applied o obtain a three lobe when the reduction obtained with one lobe must be divided by 3 and so on, though it will be appreciated that alternations in the basic driving characteristics of the unit, necessitating careful re-consideration, are involved.

To summarize, the process of generation referred to consists of determining the displacements JG and then disposing such displacements JG angularly to suit the particularly required speed change arrangement, thereby determining the shape of the cam 1 and enabling it to be cut on a variety of machines now available or, by devising a machine for the purposes, cutting the cam 1 physically to a shape determined by the shape of the recess 5 whilst imitating the relative motions of the components in the unit.

It is repeated that a necessary condition for this procedure of generation is that the rollers remain theoretically in constant contact both with the cam 1 and the track 3 as the mechanism operates. In practice the cam track 3 and the cam 1 which is generated from the cam track 3, are manufactured as closely as possible to the theoretical form allowing only for expansion of the materials used with heat and for lubrication requirements.

Figure 14:
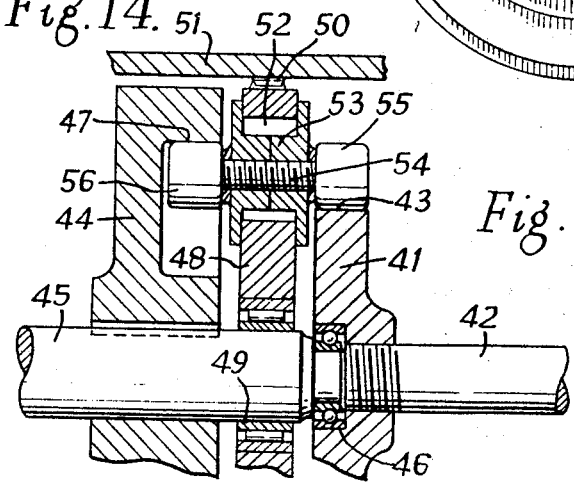

As indicated hereinbefore, it may in certain cases, be preferably that the array of rollers which engages the cam track on the array (iii) does not itself engage the cam (i), each of the rollers being operated by an associated roller (which latter then engages the cam (i)) and the two associated rollers being connected to move to-and-fro together. In such cases there will be two arrays of rollers, but the generation procedure will be essentially the same. Examples of mechanisms with two arrays of rollers are shown in FIGURES 14 and 16 of the drawings.

A number of differently arranged mechanisms according to the invention will now be described, by way of example only, with reference to the drawings to demonstrate the versatility of the invention.

Figure 8:
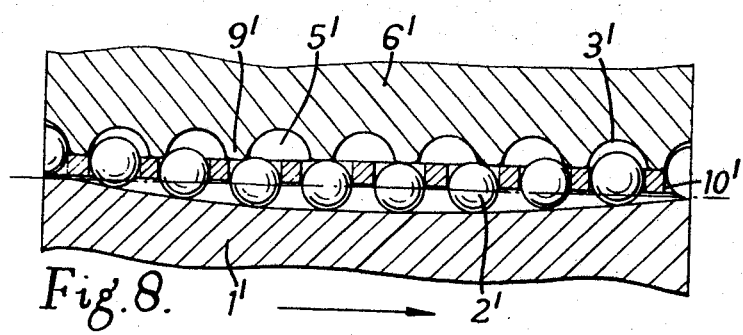
FIGURE 8 is a diagrammatic view of a mechanism having a linear motion.

FIGURE 8 is a diagrammatic view of the cam (i), component (ii) and array (iii) and the interposed rollers in a mechanism having a linear motion.

This mechanism comprises a cam 1' moving in the direction of the arrow, acting on ten rollers 2' set in the component (ii) which in turn are acting on the teeth 9' of the component (iii). In this figure there is shown the component (i), viz the cam 1', the component (ii) (marked 10') and the array (iii) (marked 6'), which latter has teeth 9' and recesses 5' to make a track 3' of the same shape as the track 3 except that the lands are straight and not arcuate. The components 10', 6' and the cam 1' are mounted in guideways (not shown) for relative sliding movement from side to side in FIGURE 8, but cannot separate from one another transversely of this sliding movement. It will be seen that, starting on the left of the figure, the first roller is not in a driving position, the 2nd, 3rd, and 4th are, the 5th and 6th are contacting the lands and the 7th, 8th and 9th are being returned to a driving position. If component (ii) is held, array (iii) will move in the opposite direction to the cam 1' at a reduced speed of 8 to 1. Alternatively, if the rollers are reduced to 7 in number, array (iii) will travel in the same direction as cam (i) still at a speed reduced 8 to 1.

Figure 9:
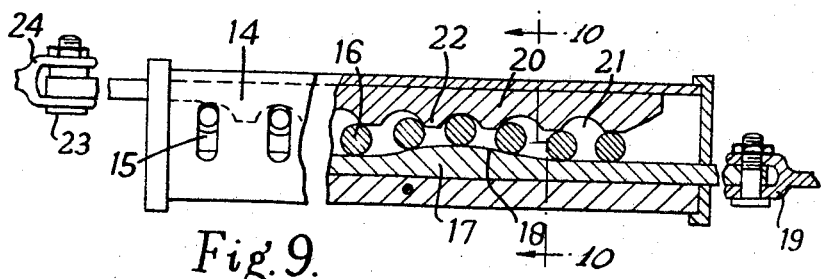
FIGURE 9 illustrates an example of a mechanism having a linear motion and incorporating the arrangement of FIGURE 8.
Figure 10:
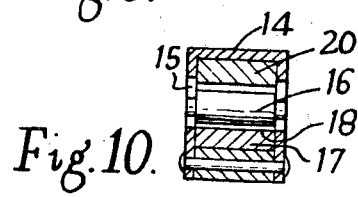
FIGURE 10 is a cross-sectional view taken on line 10—10 of FIGURE 9.

FIGURES 9 and 10 of the drawings illustrate a mechanism having a linear motion in which the arrangement shown diagrammatically in FIGURE 8 is incorporated. Component (ii) consists of a rectangular casing 14 with slots 15 cut in two opposing sides in which reduced ends of cylindrical rollers 16 are free to slide.

The cam (i) comprises a cam 17 which has a cam track 18 in contact with the rollers 16 and is free to slide within the casing 14, one end of the cam projecting outside the casing 14 and being connected through an eyebolt 19 to actuating means (not shown).

The array (iii) comprises a rack 20 with recesses 21 cut on the face opposing the cam track 18, interposed with lands 22, one end of the rack projecting from the casing and being connected through an eyebolt 23 with an actuating rod 24.

Normally this mechanism would operate with array (iii) held so that when the eyebolt 19 is moved by the actuating means the actuating rod 24 moves at one-eighth of the speed of the eyebolt 19, in the opposite direction. If required to move in the same direction it would be necessary to reduce the number of rollers 16 to seven.

Figure 11:
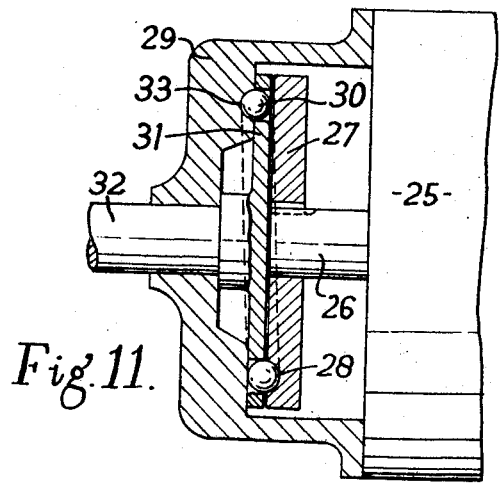
FIGURE 11 shows an example of a disc-type speed changing mechanism according to the invention.

In FIGURE 11 a disc type of speed changing mechanism incorporating features of the invention is illustrated. It is mounted as an integral part of the end shield of an electric motor 25 whose output shaft 26 has affixed to it the component (i) comprising a cam 27 having a cam track 28 which faces in a direction parallel to the axis of the shaft 26, viz to the left in FIGURE 11. The casing 29 acts as the end shield of the motor to which it is fixed and provides the component (iii). Thus it has a cam track 33 on its inner face which track also faces in a direction parallel to the axis of the shaft 26, viz to the right in FIGURE 11. The track 33 comprises an annular array of recesses and lands (following generally the profile shown in FIGURE 1 but with each land in this case being in the form of an arc of a circle in a plane perpendicular to the axis of the shaft 26) with recesses taking the form of a groove hose radius is the same as the radius of the rollers 30, which latter are spherical and are interposed between the two cam tracks.

Component (ii) comprises a disc 31 attached to an output shaft 32 with holes arranged in an annular array of a size just permitting the rollers 30 to move freely to and fro axially. Except that the movement of the rollers is axial the principle of operation is the same as that of the mechanism shown in FIGURES 2 and 3.

Figure 12:
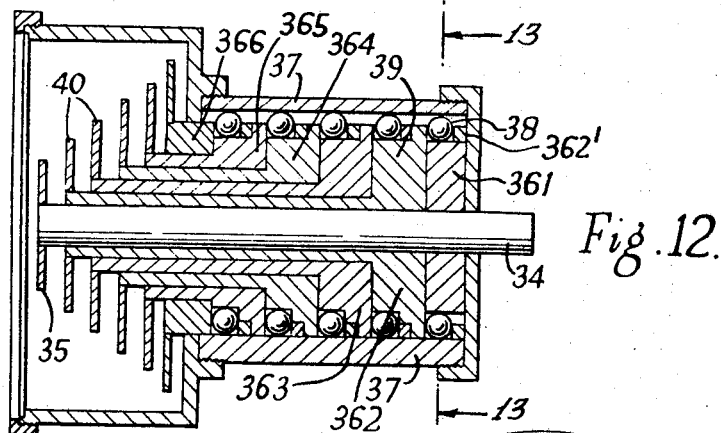
FIGURE 12 shows a mechanism according to the invention applied to a compound reduction unit used in the registering device of a gas meter.
Figure 13:
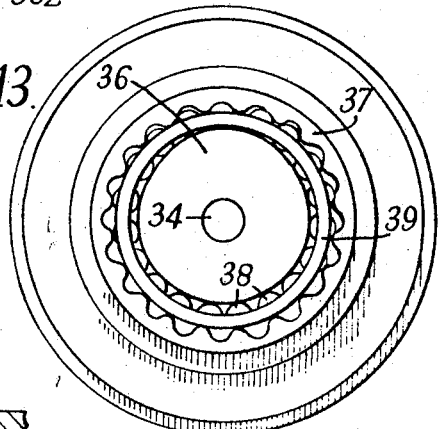
FIGURE 13 is a cross-sectional view taken along line 13—13 of FIGURE 12.

FIGURES 12 and 13 show the present invention applied to a compact compound reduction unit used in the registering device of a gas meter.

This unit comprises five mechanisms arranged to act in stages to record the number of half units of gas used, the first mechanism recording 1 to 20 half units, the second the tens of half units, the third the hundreds of half units and so on, the overall reduction of each stage being 20 and the overall reduction from first to last stage being 3,200,000.

The first mechanism is driven by a main spindle 34 coupled to the mechanism of the gas meter. The spindle 34 carries a reading dial 35 and a cam 361 which constitutes the cam (i).

The array (iii), formed with a series of recesses arranged opposite the cam 361, is provided by the fixed casing 37 of the unit; these recesses are formed as parts of a series of longitudinal cavities extending the whole length of the casing 37 which latter also serve as recesses for the other four mechanisms, so that the casing 37 provides the array (iii) of each of the five mechanisms.

Interposed between the recesses and the cam 361 is an array of spherical rollers 38. There are five such arrays, each array being located in holes in annular extensions of the cam of the next stage which thus comprises the component (ii) of the previous stage. Five cams 361, 362, 363, 364, 365 are marked in FIGURE 12, all except 361 being free to rotate upon the spindle 34, while 362' indicates an extension of 362 in the holes of which extension the right hand array of rollers 38 is free to move radially but not axially or circumferentially.

Each of the cams 362, 363, 364, 365 and a final member 366 each carry a dial 40, and these dials are arranged one behind the other, behind the dial 35 at the front end of the gas meter.

In operation, the reduced drive produced by the first mechanism is transmitted to the second mechanism which reduces it further, the reduced drive thus obtained being further reduced by the third mechanism and so on. The amount of rotation of the cam (361, 362 etc.) of each mechanism is recorded by a corresponding movement of the dial concerned.

Since the input speed is moderate and output torques negligible, the shape of the recesses may well be as shown in FIGURE 4 or even as in FIGURE 5.

In the example of FIGURE 14, the cam (i) comprising the cam 41, is mounted on a shaft 42 coupled to driving means (not shown) and is formed with a cam face 43. An array (iii) in the form of a member 44 is secured to an output shaft 45 which extends right through the member 44 and is supported in bearings 46 carried by the cam 41. The member 44 is formed with a recessed face 47 which is offset with respect to the cam face 43 in the axial direction.

Component (ii) comprises a member 48 in the form of a disc and is supported through bearings 49 on the shaft 45. A toothed segment 50 fixed to the casing of the mechanism engages a complementary toothed portion of the periphery of component (ii) and hence holds the latter against rotation. Mounted for sliding movement in radial slots 52 formed in the component (ii) are a number of evenly spaced slide blocks 53 each of which carries a spindle 54 supporting at its ends two rollers 55, 56. The rollers 55 are in contact with the cam face 43 and the rollers 56 are in engagement with the recessed face 47.

In operation, as the shaft 42 is rotated, a drive reaction is applied by the cam face 43 to the rollers 55 and is transmitted through the spindles 54 and the slide blocks 53 to the rollers 56, which are thereby moved into and out of the recesses in the face 47, the member 44 and the output shaft 45 being driven accordingly.

Referring to FIGURE 15 of the drawings, the cam (i), comprised of the cam 57, is mounted on the input shaft 58 and is formed with a cam face 59. The array (iii) which is driven, is disposed behind the cam (i) as viewed in this figure and is formed with a recessed face 60 (shown by dotted lines) which is at the side of the cam face 59 and faces in the same direction, i.e. radially outwards. The component (ii) comprises a disc 61 which is interposed between the cam (i) and array (iii) and is held against rotation by a fixed toothed segment 62. Mounted for turning in the disc 61 is a plurality of evenly spaced spindles 63 which extend through the component (ii) in the axial direction. Secured to each spindle 63 at one side of the component (ii) is one end of a link 64 which carries at its other end a roller 65 in engagement with the cam face 59 of the cam 57. Each spindle 63 has fixed thereto at the other side of the component (ii) one end of a link 66, the other end of which carries a roller 67 in contact with the recessed face 60 of the array (iii).

In operation, the cam face 59 exerts a drive reaction on the rollers 65 as the cam (i) is rotated. As a result the links 64 are moved and turn the spindles 63, thus pivoting the links 66 and thereby moving the rollers 67 into and out of the recesses in the face 60 thus driving the array (iii).

The arrangements shown in FIGURES 14, 15 and the next FIGURE 16 are all such that sliding friction can be reduced to a minimum, and being more costly as a result of more sophistication, they are likely to be confined to applications where high efficiencies are important and high input powers are likely. The shape of the recesses is likely, therefore, to be as shown in FIGURE 1. In the case of the arrangement shown in FIGURE 15 a slight modification to the generation procedure already described is necessary on account of the links 64 and 66 having an angular movement.

In the mechanism shown in FIGURE 16 the cam (i) comprises a cam 68 which is mounted on a drive shaft 69 and is formed with a cam face 70. The array (iii) comprises a flanged member 71 mounted on an output shaft 72 and formed with a recessed face 73 arranged directly opposite the cam face 70. The component (ii) comprises a disc 74 rotatably mounted through bearings on the shaft 69 and is fixed to the casing 75 of the mechanism. The disc 74 is formed with an array of evenly spaced radial slots 76 in each of which is mounted a slide 77 carrying two parallel spindles 78. These two spindles support rollers 79 and 80 which are arranged side by side and are in contact with the cam face 70 and the recessed face 73 respectively.

In operation, the drive reaction exerted on the rollers 79 by the cam face 70 of the rotating cam 68 causes the slides 77 to move radially in their slots 76, whereby the rollers 80 are moved into and out of the recesses in the recessed 73 and the component 71 is driven.

As hereinbefore mentioned, a generally similar shape for the recesses as in the previous two examples is likely to be appropriate in this instance too.

Figure 18:
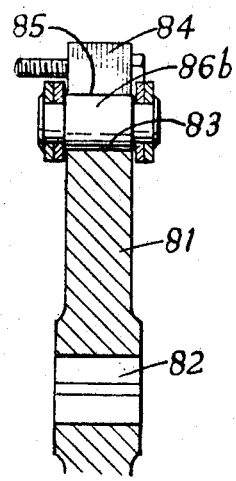
FIGURE 18 is a partial sectional view taken along line 18—18 of FIGURE 17.

In FIGURES 17 and 18 of the drawings, the cam (i) comprises a cam 81 mounted on a drive shaft 82 and formed around its periphery with a cam face 83. The array (iii) comprises a fixed arcuate section 84 which extends half way round the component (i) and is formed with a series of recesses 85. The component (ii) comprises a continuous roller link chain 86 complete with a plurality of articulated links 86a connected together by rollers 86b. This chain passes round the component 81 and a sprocket (not shown) which is driven. Thus, the rollers 86b are engaged between the arcuate section 84 and the portion of the cam 81 opposite the latter.

In operation, rotation of the cam 81 causes the rollers 86b to be moved by the cam face 83 into and out of the recesses 85 in the member 84, the links being pivoted relatively to one another in conformity with this movement. As a result the chain is moved round the arcuate section 84 at a speed reduced in the ratio of 10 to 1 (in the instance shown in FIGURE 17) as compared with the speed at which it would have been driven if the cam 81 had been a conventional sprocket wheel. It is to be noted that the distance or pitch $p$ betwen the axes of each two adjacent rollers 86b is different from the distance $d$ between two adjacent recesses and this phasing has to be such that there is a difference of one between the number of recesses and rollers.

Figure 6:
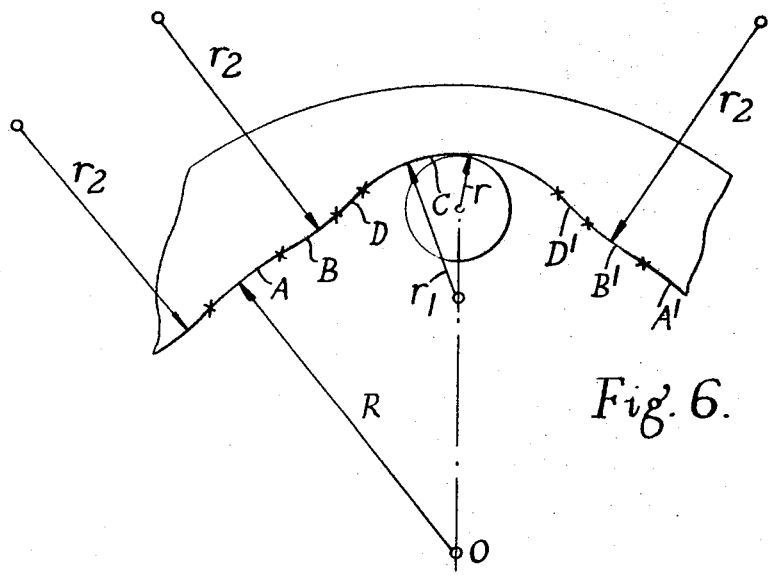
FIGURE 6 is a similar view showing another example of a recess.

The shape of the recesses in this instance is likely to be that shown in FIGURES 4 and 5 though the alternative shown in FIGURE 6 may also be appropriate. Some slight modification of the generation procedure hereinbefore described may be required on account of the relative movements of the rollers 86b within the chain.

It will be appreciated from the foregoing that, by use of this invention, a highly flexible approach to the wide variety of speed changing problems met in industry today can be adopted, which does not necessitate the manufacture of special machinery and offers the possibility of an economical solution over a broad field.

What I claim is:

1. A roller based speed changing mechanism comprising a cam track and a recessed track, one of said tracks surrounding the other of said tracks, said recessed track including an array of identical sections evenly spaced from one another and each having a recess; and an array of identical rolling bodies which are located between and in contact with both of said tracks and are movable relatively to one another into and out of driving engagement with the sections of the recessed track under the control of the cam track, wherein the surface of the recessed track includes first portions of finite area constructed in accordance with a first computation which is a first formula representing a first shape wherein the variable in the said first formula is assigned a first constant value, and wherein said surface of the recessed track includes second portions of finite area constructed in accordance with a second computation which is one of the following:

(a) the same said first formula representing said first shape wherein the variable in the said first formula is assigned a second constant value different from the first constant value, and, (b) a second formula representing a second shape different from said first shape, the shape of the cam track being constructed in accordance with a mathematical generation of the shape of the recessed track, said generation providing a cam track shape which cooperates with the shape of the recessed track so that the rolling bodies remain in constant contact with both of said tracks upon relative rotation between the tracks.

2. A mechanism according to claim 1, wherein the said two portions of the recessed track comprise at least two similarly shaped curved portions, both conforming to said first formula but with different constant values assigned to variables of the formula.

3. A mechanism according to claim 1, wherein the said two portions of the recessed track comprise at least two differently shaped curved portions conforming to two different formulae.

4. A mechanism according to claim 1, wherein the said two portions of the recessed track comprise at least one curved portion conforming to said first formula, and at least one linear portion.

5. A mechanism according to claim 1, arranged to undergo motion, wherein the shape of the recessed track comprises at least three linear portions at different relative inclinations.

6. A mechanism according to claim 2, arranged to undergo rotary motion, wherein the said first formula is the formula for a circular arc and wherein each recess of the recessed track comprises a central portion in the form of a circular arc of a specific radius, which arc blends at each end into a circular arc of a specific smaller radius, the centers of the circular arcs of smaller radius lying on the opposite side of the recessed track to the center of the arc of larger radius.

7. A mechanism according to claim 6, wherein the difference between said larger radius and said smaller radius is substantially twice the radius of the rolling bodies engaging the recessed track.

8. A mechanism according to claim 1, arranged to undergo rotary motion, wherein the distance of the recessed track from the axis of the mechanism varies along the track, and each section of the track has a curved portion in the form of an arc of a circle centered about the axis, such portion separating the recesses one from the other along the track and constituting lands.

9. A mechanism according to claim 1, arranged to undergo rotary motion, wherein the recessed track faces in a direction parallel to the axis of the mechanism and each section of the track has a portion in the form of an arc of a circle in a plane perpendicular to the axis, such portions separating the recessed one from the other along the track and constituting lands.

10. A mechanism according to claim 1, arranged to undergo linear motion, wherein the recesses are separated one from the other along the recessed track by linear portions lying parallel to the direction of motion and constituting lands.

11. A mechanism according to claim 1, wherein the recessed track and the cam are arranged directly opposite one another, there being at least one array of rolling bodies engaging both the track and the cam respectively and which are coupled together in pairs for movement in unison.

12. A mechanism according to claim 1, wherein the recessed track and the cam are arranged side by side so as to face in the same direction, there being two arrays of rolling bodies which engage the track and the cam respectively and are coupled together in pairs for movement in unison.

13. A mechanism according to claim 1, wherein the recessed track and the cam are laterally offset from one another and face in opposite directions, there being two arrays of rolling bodies which engage the track and the cam respectively and are coupled together in pairs for movement in unison.

14. A mechanism according to claim 11, with a single array of rolling bodies, wherein the latter are accommodated in a series of spaced apertures formed in a cage located between the recessed track and the cam, the rollers being freely movable relatively to the cage.

15. A mechanism according to claim 11, with two arrays of rolling bodies of cylindrical form, wherein the rolling bodies of each associated pair are arranged side by side with their axes parallel and are carried by a slide, the slides being mounted on a common component for movement relatively thereto.

16. A mechanism according to claim 14, with a single array of rolling bodies of spherical form and having a rotary motion, wherein the recessed track and the cam are provided on the opposed faces of two coaxial, spaced components of circular cross section and are of annular form, the cage being of circular cross section and being disposed between these two components in axial alignment therewith.

17. A mechanism according to claim 12, wherein the rolling bodies of each associated pair are of cylindrical form and constitute part of a unit comprising two links which are attached at one of their ends to the respective ends of a spindle mounted for turning in a component disposed between the recessed track and the cam, these links extending radially of the spindle and carrying at their outer ends the two rolling bodies which are rotatable about axes parallel to one another and to the spindle, all the spindles being carried by the said component.

18. A mechanism according to claim 13, wherein the rolling bodies of each associated pair are of cylindrical form, are arranged end-to-end so as to be rotatable about a common axis and are carried by a slide, the slides being mounted on a common component for movement relatively thereto.

19. A mechanism according to claim 11 with a single array of rolling bodies of cylindrical form, wherein the rolling bodies are coupled together by a series of articulated links so as to form a roller chain.

20. A set of roller-based mechanisms according to claim 1, arranged to undergo a rotary motion, each mechanism of the set having a different input/output ratio wherein the recesses of the recessed tracks of the mechanisms of the set are all of one shape, whereas the recesses in each mechanism are separated one from the other along the recessed track by lands of a size which differs from one mechanism to the next so as to provide a different number of recesses in each mechanism of the set, the rolling bodies being the same for all the mechanisms of the set and the shapes of the cams, which differ from one mechanism to the next, being generations of the respective recessed tracks, whereby the rolling bodies remain in constant contact with the cam and the recessed track as the mechanisms operate.

References Cited

UNITED STATES PATENTS

| 2,628,605 | 2/1953 | Jones et al. | 74—567 |
| 3,034,363 | 5/1962 | Vogel | 74—567 |
| 3,192,799 | 7/1965 | Pamplin | 74—805 |
| 1,449,352 | 3/1923 | Seeck | 74—63 |
| 1,738,662 | 12/1929 | Morison | 74—63 |
| 2,170,951 | 8/1939 | Perry | 74—804 |
| 2,704,459 | 3/1957 | Nanni | 74—63 |
| 2,791,132 | 5/1957 | Wiczer | 74—63 |
| 3,039,324 | 6/1962 | Waterfield | 74—63 |
| 3,145,574 | 8/1964 | Morgan | 74—63 |
| 3,307,434 | 3/1967 | Kope | 74—804 |

FOREIGN PATENTS 177,854  3/1922  Great Britain.

FRED C. MATTERN, Jr., Primary Examiner

W. S. RATLIFF, Jr., Assistant Examiner